(12) United States Patent
Yang et al.

(10) Patent No.: US 12,095,111 B2
(45) Date of Patent: Sep. 17, 2024

(54) BATTERY CELL, BATTERY, ELECTRICAL DEVICE, MANUFACTURING METHOD, AND MANUFACTURING DEVICE

(71) Applicant: JIANGSU CONTEMPORARY AMPEREX TECHNOLOGY LIMITED, Jiangsu (CN)

(72) Inventors: Jianxiong Yang, Jiangsu (CN); Siying Huang, Jiangsu (CN); Zhijun Guo, Jiangsu (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 201 days.

(21) Appl. No.: 18/046,509

(22) Filed: Oct. 14, 2022

(65) Prior Publication Data
US 2023/0114279 A1    Apr. 13, 2023

Related U.S. Application Data

(63) Continuation of application No. PCT/CN2021/083193, filed on Mar. 26, 2021.

(51) Int. Cl.
*H01M 50/342* (2021.01)
*H01M 50/147* (2021.01)
(Continued)

(52) U.S. Cl.
CPC ....... *H01M 50/342* (2021.01); *H01M 50/147* (2021.01); *H01M 50/233* (2021.01);
(Continued)

(58) Field of Classification Search
CPC ........... H01M 50/342; H01M 50/3425; H01M 50/375; H01M 50/147; H01M 50/233; H01M 50/204; H01M 2220/20
See application file for complete search history.

(56) References Cited

U.S. PATENT DOCUMENTS

2007/0275294 A1    11/2007   Stearns et al.

FOREIGN PATENT DOCUMENTS

| CN | 103035863 A | 4/2013 |
| CN | 205582984 U | * 9/2016 |

(Continued)

OTHER PUBLICATIONS

International Search Report and Written Opinion received in PCT Application PCT/CN2020/083193 on Dec. 20, 2021.
(Continued)

*Primary Examiner* — Basia A Ridley
*Assistant Examiner* — Heng M. Chan
(74) *Attorney, Agent, or Firm* — Kilpatrick Townsend & Stockton LLP

(57) ABSTRACT

A battery cell, a battery, an electrical device, a manufacturing method, and a manufacturing device are. In some embodiments, the battery cell includes: a shell, where the shell includes a wall; and a pressure relief mechanism, where the pressure relief mechanism is disposed on the wall, the pressure relief mechanism includes a body portion and a fragile portion connected to the body portion, the body portion is configured to connect to the wall, and the pressure relief mechanism is configured to break the fragile portion when an internal pressure or temperature of the battery cell reaches a threshold, so as to release the pressure. The pressure relief mechanism further includes a reinforcement portion disposed in the body portion in a thickness direction of the body portion. The reinforcement portion is configured to reduce deformation of the body portion.

16 Claims, 7 Drawing Sheets

(51) Int. Cl.
    *H01M 50/204*    (2021.01)
    *H01M 50/233*    (2021.01)

(52) U.S. Cl.
    CPC ...... *H01M 50/3425* (2021.01); *H01M 50/204* (2021.01); *H01M 2220/20* (2013.01)

(56) References Cited

FOREIGN PATENT DOCUMENTS

| | | | | |
|---|---|---|---|---|
| CN | 107331821 A | | 11/2017 | |
| CN | 207542310 U | | 6/2018 | |
| CN | 207690886 U | * | 8/2018 | ........ H01M 10/0525 |
| CN | 208460852 U | | 2/2019 | |
| CN | 111916615 A | | 11/2020 | |
| CN | 212136565 U | | 12/2020 | |
| CN | 213546446 U | | 6/2021 | |
| EP | 2388846 A1 | | 11/2011 | |
| JP | 2003346762 A | | 12/2003 | |
| JP | 2017073195 A | | 4/2017 | |
| WO | 2019165648 A1 | | 9/2019 | |

OTHER PUBLICATIONS

The first Office Action issued in the Chinese corresponding application 202110323270.6.
Notice of Reasons for Refusal received in the corresponding Japanese application 2022-545097, mailed on Sep. 4, 2023.
The extended European search report received in the corresponding European Application 21918117.9, mailed Mar. 21, 2023.

* cited by examiner

BATTERY CELL, BATTERY, ELECTRICAL DEVICE, MANUFACTURING METHOD, AND MANUFACTURING DEVICE

CROSS-REFERENCE TO RELATED APPLICATIONS

This application is a continuation of International Application PCT/CN2021/083193, filed Mar. 26, 2021, and entitled "BATTERY CELL, BATTERY, ELECTRICAL DEVICE, MANUFACTURING METHOD, AND MANUFACTURING DEVICE", which is incorporated herein by reference in its entity.

TECHNICAL FIELD

This application relates to the technical field of batteries, and in particular, to a battery cell, a battery, an electrical device, a manufacturing method, and a manufacturing device.

BACKGROUND

Due to advantages such as a high energy density, a high power density, reusability for many cycles, a long shelf life, rechargeable batteries have been widely used in electric vehicles, mobile devices, or power tools. A battery includes a plurality of battery cells connected in series, parallel, or series-and-parallel pattern. During the use of the battery, a battery cell sometimes bursts to relieve pressure in a case of no thermal runaway, thereby affecting the normal use of the battery.

SUMMARY

This application provides a battery cell, a battery, an electrical device, a manufacturing method, and a manufacturing device to solve the problem of the battery cell bursting to relieve pressure in a case of no thermal runaway.

According to one aspect, this application discloses a battery cell, including:
  a shell, where the shell includes a wall; and
  a pressure relief mechanism, where the pressure relief mechanism is disposed on the wall, the pressure relief mechanism includes a body portion and a fragile portion connected to the body portion, the body portion is configured to connect to the wall, and the pressure relief mechanism is configured to break the fragile portion when an internal pressure or temperature of the battery cell reaches a threshold, so as to release the pressure.

The pressure relief mechanism further includes a reinforcement portion disposed in the body portion in a thickness direction of the body portion, and the reinforcement portion is configured to reduce deformation of the body portion.

In the battery cell according to this application, the reinforcement portion of the pressure relief mechanism can reduce deformation of the body portion. Therefore, with the pressure relief mechanism that includes the reinforcement portion, the extent of bulge or dent deformation in a corresponding region on the body portion decreases. This helps to decrease an alternating stress borne by the fragile portion connected to the body portion, and reduce the probability that the pressure relief mechanism bursts prematurely to relieve pressure when the battery cell is in normal use, where the premature burst is caused by alternating fatigue and aging or breakage of the fragile portion connected to the body portion. This also helps to improve the safety and stability of the battery in use.

According to one embodiment, the reinforcement portion protrudes outward from a surface of the body portion along the thickness direction.

Without occupying the space inside the battery cell, the reinforcement portion can still reduce the possibility that the reinforcement portion is corroded and damaged by an electrolytic solution, where the corrosion and damage impair the strength of the reinforcement portion.

According to one embodiment, the reinforcement portion is a solid bulge disposed on the body portion.

When the reinforcement portion is a solid bulge, the reinforcement portion is relatively strong and highly resistant to impact deformation. Therefore, when an external force is exerted on the reinforcement portion, the reinforcement portion is not prone to being dented, collapsed, or deformed.

According to one embodiment, the fragile portion is formed by making a groove on the pressure relief mechanism. A thickness of the fragile portion is less than a thickness of the body portion.

According to one embodiment, the groove is annular. The body portion includes a first connecting portion and a second connecting portion. The first connecting portion and the second connecting portion are located on two sides of the groove along a width direction of the groove respectively. The first connecting portion is configured to connect the wall. The second connecting portion is located in a region enclosed by the groove. The reinforcement portion is disposed on the second connecting portion.

The reinforcement portion is located in a region enclosed by the groove. Therefore, the reinforcement portion increases the strength of the region enclosed by the groove, helps to reduce the extent of deformation of the region enclosed by the groove, and in turn, reduces the alternating stress borne by the fragile portion connected to the body portion.

According to one embodiment, the reinforcement portion includes two end regions, a minimum thickness of the end regions is H, and a minimum spacing between the end regions and the groove is L, where $0.1 < H/L < 0.45$.

When the ratio of H to L is less than or equal to 0.1, the minimum thickness of an end region of the reinforcement portion is deficient, or the minimum spacing between the end region and the groove is excessive. In this case, the reinforcement effect exerted by the reinforcement portion on the region close to the groove on the body portion is insignificant or absent. Consequently, the amount of deformation of the region close to the groove on the body portion is still excessive when the same pressure is borne, and therefore, the alternating stress borne by the fragile portion connected to the body portion is still relatively large.

When the ratio of H to L is greater than or equal to 0.45, the minimum thickness of the end region of the reinforcement portion is excessive, or the minimum spacing between the end region and the groove is deficient. In this case, the reinforcement strength exerted by the reinforcement portion on the region close to the groove on the body portion is excessive. Consequently, the amount of deformation of the region close to the groove on the body portion is deficient when the same pressure is borne. This makes it possible that the fragile portion connected to the body portion is still not broken when the internal pressure of the battery cell reaches a preset value, and affects the normal burst and pressure relieving action of the pressure relief mechanism.

According to one embodiment, the reinforcement portion includes two end regions. A minimum spacing between one of the end regions and the groove is equal to a minimum spacing between the other end region and the groove.

The two end regions of the reinforcement portion exert the same reinforcement strength on the region close to the groove on the body portion, thereby reducing the probability that the extent of deformation varies between the regions corresponding to the two end regions on the body portion. This helps to ensure consistency of the pressure values that can be endured when the fragile portion connected to the body portion is broken.

According to one embodiment, the region enclosed by the groove possesses an axis. The reinforcement portion includes two end regions, and a thickness of the end regions gradually decreases in a direction from the end regions to the axis.

The reinforcement portion with gradually changing thicknesses reduces the probability that the fragile portion connected to the body portion is prematurely broken, and also reduces the probability that, due to the reinforcement portion disposed, the fragile portion connected to the body portion is not easily broken accurately in time because of a deficient shearing force borne by the fragile portion along the thickness direction.

According to one embodiment, the two reinforcement portions intersect.

The two reinforcement portions may extend in different directions. Each reinforcement portion exerts a reinforcing force on the body portion from a different direction, thereby helping to improve consistency of overall reinforcement effects exerted by the reinforcement portion on the body portion, and in turn, helping to improve consistency of the pressure values that can be endured when the fragile portion connected to the body portion is broken at different positions.

According to one embodiment, the reinforcement portions are strip-shaped structures, and the two reinforcement portions are perpendicular to each other.

The two reinforcement portions can reinforce different regions of the body portion in two mutually perpendicular directions, thereby helping to further increase the overall strength of the body portion.

According to one embodiment, along the thickness direction, an orthographic projection area of the two reinforcement portions is S1, and an orthographic projection area of a region enclosed by the groove is S2, where $0.2 < S1/S2 < 0.3$.

When a ratio of S1 to S2 is less than or equal to 0.2, the orthographic projection area of the two reinforcement portions is deficient. That is, the coverage area of the two reinforcement portions is deficient. Consequently, it is possible that some regions on the body portion fail to be strengthened by the reinforcement portion. Consequently, some regions corresponding to the groove on the body portion still bear the alternating stress, and the pressure relief mechanism may burst prematurely to relieve pressure due to alternating fatigue and aging or breakage in such regions. When the ratio of S1 to S2 is greater than or equal to 0.3, the orthographic projection area of the two reinforcement portions is excessive. That is, the coverage area of the two reinforcement portions is excessive. Consequently, the overall reinforcement strength exerted by the reinforcement portions on the body portion is excessive, and the body portion is hardly deformable as a whole. Therefore, it is possible that the fragile portion connected to the body portion is not broken in time under a preset pressure value.

According to one embodiment, a through-hole is made on the wall. The body portion covers the through-hole, and the reinforcement portion is located in the through-hole. The reinforcement portion does not exceed an outer surface of the wall along a direction from inside the shell outward.

When another structural part is disposed at a position corresponding to the through-hole on the outer side of the battery cell, an active space is reserved between the reinforcement portion and the structural part. In this way, the body portion can bulge and deform normally to ensure that the fragile portion connected to the body portion is broken in time under a preset pressure value. This reduces the probability that the fragile portion connected to the body portion is hardly breakable in time under a preset pressure value because the body portion can hardly bulge and deform due to contact between the reinforcement portion and the structural part.

According to one embodiment, the battery cell further includes a protection sheet. The protection sheet is attached to the outer surface of the wall and covers the pressure relief mechanism.

The protection sheet can protect the pressure relief mechanism, and reduce the probability that an external object accidentally impacts or scratches the body portion so that the body portion is distorted or deformed or dented to affect normal breakage and burst of the fragile portion connected to the body portion.

According to one embodiment, the shell includes an end cap and a housing. The housing is provided with an opening. The end cap is configured to cover the opening. The housing includes a sidewall and a bottom wall. The sidewall is configured to connect to the end cap. The bottom wall and the opening are disposed opposite to each other along the thickness direction. Both a thickness of the sidewall and a thickness of the bottom wall are less than a thickness of the end cap. The wall is the sidewall or the bottom wall.

The thickness of the housing is less than the thickness of the end cap, so that the end cap is more rigid than the housing. Under the same pressure, the extent of deformation of the end cap is smaller than that of the housing. In a process of transportation, temperature change, or charging or discharging of the battery cell, the internal pressure of the battery cell changes between high and low alternately. Therefore, the pressure relief mechanism is disposed on the sidewall and/or bottom wall of the housing rather than on the end cap. In this way, in a case that the end cap is disposed toward a passenger compartment, high-temperature and high-pressure emissions are not prone to be expelled to the passenger compartment at the time of actuating the pressure relief mechanism, thereby avoiding direct threat to personal safety.

Further, the thickness of the sidewall or bottom wall of the housing is less than the thickness of the end cap. Therefore, the sidewall or bottom wall of the housing is deformed to a greater extent than the end cap under the internal pressure, and in turn, exerts a greater impact on the pressure relief mechanism, resulting in a greater extent of deformation of the body portion. In this case, it is more necessary for the reinforcement portion to reinforce the body portion to reduce the deformation of the body portion and thereby reduce the alternating stress borne by the fragile portion.

According to another aspect, this application provides a battery. The battery includes the battery cell according to the foregoing embodiment.

According to still another aspect, this application provides an electrical device. The electrical device includes the battery according to the foregoing embodiment. The battery is configured to provide electrical energy.

According to yet another aspect, this application provides a method for manufacturing a battery cell. The method includes:

providing an end cap and a housing, where the housing is provided with an opening, the end cap is configured to cover the opening, the housing includes a sidewall and a bottom wall, the sidewall is configured to connect to the end cap, the bottom wall is disposed opposite to the opening, both a thickness of the sidewall and a thickness of the bottom wall are less than a thickness of the end cap, a through-hole and a pressure relief mechanism are disposed on the sidewall or the bottom wall, the pressure relief mechanism includes a body portion and a fragile portion connected to the body portion, the body portion is configured to connect to the sidewall or the bottom wall, the pressure relief mechanism is configured to break the fragile portion when an internal pressure or temperature of the battery cell reaches a threshold, so as to release the pressure; and the pressure relief mechanism further includes a reinforcement portion disposed in the body portion in a thickness direction of the body portion, and the reinforcement portion is configured to reduce deformation of the body portion;

providing an electrode assembly, and letting the electrode assembly be accommodated in the housing; and assembling the end cap and the housing, connecting the end cap to the sidewall, and leaving the end cap to cover the opening.

In the battery cell manufactured by the method for manufacturing a battery cell according to this embodiment of this application, the reinforcement portion of the pressure relief mechanism can reinforce the body portion, and reduce deformation of the body portion. Therefore, with the pressure relief mechanism that includes the reinforcement portion, the extent of bulge or dent deformation of the body portion of the pressure relief mechanism decreases when the internal pressure of the battery cell changes between high and low alternately. This helps to decrease the alternating stress borne by the fragile portion connected to the body portion, and reduce the probability that the pressure relief mechanism bursts prematurely to relieve pressure when the battery cell is in normal use, where the premature burst is caused by alternating fatigue and aging or breakage of the fragile portion connected to the body portion. This also helps to improve the safety and stability of the battery in use.

According to yet another aspect, this application provides a device for manufacturing a battery cell. The device includes:

a first providing module, configured to provide an end cap and a housing, where the housing is provided with an opening, the end cap is configured to cover the opening, the housing includes a sidewall and a bottom wall, the sidewall is configured to connect to the end cap, the bottom wall is disposed opposite to the opening, both a thickness of the sidewall and a thickness of the bottom wall are less than a thickness of the end cap, a through-hole and a pressure relief mechanism are disposed on the sidewall or the bottom wall, the pressure relief mechanism includes a body portion and a fragile portion connected to the body portion, the body portion is configured to connect to the sidewall or the bottom wall, the pressure relief mechanism is configured to break the fragile portion when an internal pressure or temperature of the battery cell reaches a threshold, so as to release the pressure; and the pressure relief mechanism further includes a reinforcement portion disposed in the body portion in a thickness direction of the body portion, and the reinforcement portion is configured to reduce deformation of the body portion;

a second providing module, configured to provide an electrode assembly, and let the electrode assembly be accommodated in the housing; and an assembling module, configured to assemble the end cap and the housing, connect the end cap to the sidewall, and leave the end cap to cover the opening.

In the battery cell manufactured by the device for manufacturing a battery cell according to this embodiment of this application, the reinforcement portion of the pressure relief mechanism can reinforce the body portion, and reduce deformation of the body portion. Therefore, with the pressure relief mechanism that includes the reinforcement portion, the extent of bulge or dent deformation of the body portion of the pressure relief mechanism decreases when the internal pressure of the battery cell changes between high and low alternately. This helps to decrease the alternating stress borne by the fragile portion connected to the body portion, and reduce the probability that the pressure relief mechanism bursts prematurely to relieve pressure when the battery cell is in normal use, where the premature burst is caused by alternating fatigue and aging or breakage of the fragile portion connected to the body portion. This also helps to improve the safety and stability of the battery in use.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
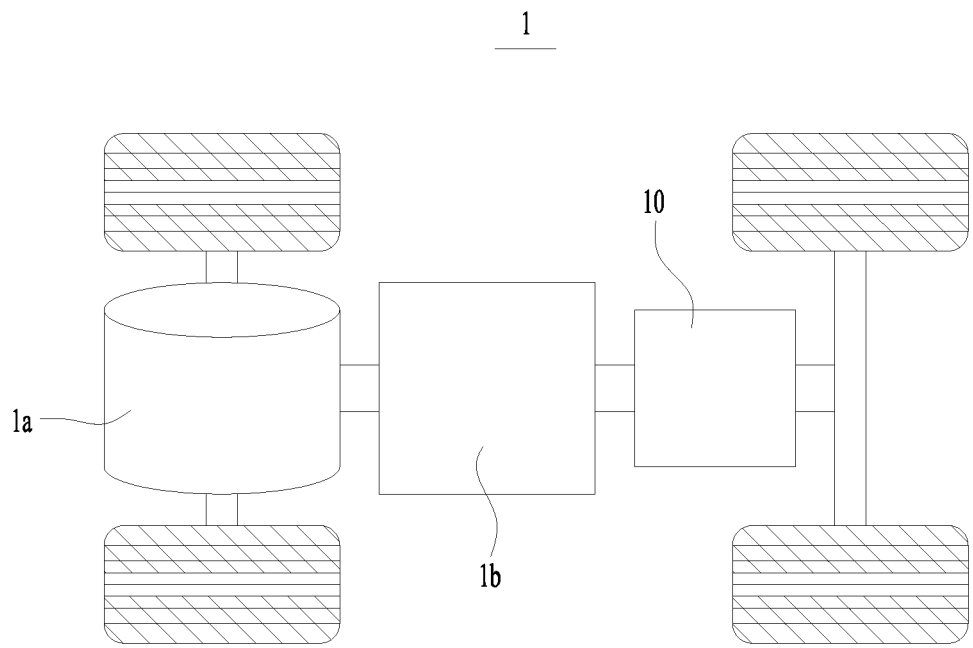
FIG. 1 is a partial schematic structural diagram of a vehicle according to one embodiment.

The drawings are not drawn to scale.

DETAILED DESCRIPTION OF EMBODIMENTS

The following gives a more detailed description of implementations of this application with reference to drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

REFERENCE NUMERALS 1. vehicle; 1a. motor; 1b. controller; 10. battery; 11. bottom shell; 12. top shell; 20. battery module; 30. battery cell; 40. shell; 41. end cap; 42. housing; 42a. sidewall; 42b. bottom wall; 421. opening; 422. through-hole; 50. electrode assembly; 60. electrode terminal; 70. connector adapter; 80. pressure relief mechanism; 80a. outer surface; 80b. inner surface; 80c. groove; 81. body portion; 811. first connecting portion; 812. second connecting portion; 82. reinforcement portion; 821. end region; 83. fragile portion; 90. protection sheet; 100. axis; 1000. manufacturing device; 1001. first providing module; 1002. second providing module; 1003. assembling module; X. thickness direction.

In accordance with the present disclosure, a battery cell may include a lithium-ion secondary battery, a lithium-ion primary battery, a lithium-sulfur battery, a sodium-lithium-ion battery, a sodium-ion battery, a magnesium-ion battery, or the like. The embodiments of this application do not limit the type of the battery cell. The battery cell may be in a cylindrical shape, a flat shape, a cuboidal shape, or other shapes. The embodiments of this application do not limit the shape of the battery cell. Depending on the form of packaging, the battery cell is typically classed into three types: cylindrical battery cell, prismatic battery cell, and pouch-type battery cell. The embodiments of this application do not limit the form of the battery cell.

The battery mentioned in various embodiments means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharge of the battery cells.

A battery cell includes an electrode assembly and an electrolytic solution. The electrode assembly includes a positive electrode plate, a negative electrode plate, and a separator. The battery cell works primarily by relying on movement of metal ions between the positive electrode plate and the negative electrode plate. The positive electrode plate includes a positive current collector and a positive active material layer. The positive active material layer is coated on a surface of the positive current collector. A part that is of the current collector and that is not coated with the positive active material layer protrudes from a part that is of the current collector and that is coated with the positive active material layer. The part that is of the current collector and that is not coated with the positive active material layer serves as a positive tab after being stacked. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. A part that is of the current collector and that is not coated with the negative active material layer protrudes from a part that is of the current collector and that is coated with the negative active material layer. The part that is of the current collector and that is not coated with the negative active material layer serves as a negative tab after being stacked. The negative current collector may be made of copper, and a negative active material may be carbon, silicon, or the like. The separator may be made of polypropylene (PP), polyethylene (PE), or another material. In addition, the electrode assembly may be a jelly-roll structure or a stacked structure, without being limited herein.

The development of the battery technology needs to allow for a plurality of design factors, including performance parameters such as energy density, cycle life, discharge capacity, charge rate, and discharge rate, and also needs to consider the safety of the battery.

The pressure relief mechanism on the battery cell exerts an important effect on the safety of the battery. For example, in a case of short circuit, overcharge, or the like, thermal runaway may occur inside the battery cell, resulting in a sudden rise in pressure or temperature. In this case, the internal pressure and heat may be released outward through the actuation of the pressure relief mechanism to prevent explosion and fire of the battery cell.

The pressure relief mechanism means an element or component that is actuated to relieve an internal pressure or temperature when the internal pressure or temperature of a battery cell reaches a preset threshold. The threshold may vary depending on design requirements. The threshold may depend on the material of one or more of the positive electrode plate, the negative electrode plate, the electrolytic solution, or the separator in the battery cell. The pressure relief mechanism may be in the form of an explosion-proof valve, a gas valve, a pressure relief valve, a safety valve, or the like, and may specifically adopt a pressure-sensitive or temperature-sensitive element or structure. To be specific, when the internal pressure or temperature of the battery cell reaches a preset threshold, the pressure relief mechanism performs an action or a fragile structure disposed in the pressure relief mechanism is ruptured to form an opening or channel for relieving the internal pressure or temperature.

The term "actuated" mentioned in this application means that the pressure relief mechanism performs an action or is activated to a given state so that the internal pressure and temperature of the battery cell is relieved. The actions performed by the pressure relief mechanism may include, but are not limited to rupturing, shattering, tearing, or opening at least a part of the pressure relief mechanism, or the like. When the pressure relief mechanism is actuated, high-temperature and high-pressure substances inside the battery cell are expelled as emissions out of the actuated position. In this way, the pressure and temperature of the battery cell are relieved under a controllable circumstance to avoid potential severer accidents.

The emissions out of the battery cell mentioned in this application include but are not limited to: electrolytic solution, melted or split positive and negative electrode plates, fragments of the separator, high-temperature and high-pressure gases generated during reactions, flames, and the like.

After finding the problem that a battery cell bursts to relieve pressure before reaching preset conditions of thermal runaway during cycling of the battery cell, the applicant analyzes and researches the structure and use environment of the battery cell. The applicant finds that the pressure relief mechanism of the battery cell is prone to premature fatigue and aging, resulting in a decrease of the threshold of the pressure relief mechanism. The pressure relief mechanism bursts prematurely before the internal pressure of the battery cell reaches the original preset pressure value. After further research, it is found that the internal pressure of the battery cell changes between high and low alternately during transportation, temperature changes, or charging or discharging. Consequently, the pressure relief mechanism turns over back and forth. When the pressure relief mechanism turns over back and forth for a long term, fatigue and aging may occur in local regions, thereby leading to lowering of an opening threshold of the pressure relief mechanism.

In view of the foregoing problem, the applicant improves the structure of the battery cell. The technical solutions according to embodiments of this application are applicable to a battery cell, a battery that includes the battery cell, and electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. Embodiments of this application do not particularly limit the electrical device.

For ease of description in the following embodiments, a vehicle is used as an example of the electrical device.

As shown in FIG. 1, a battery 10 is disposed inside the vehicle 1. The battery 10 may be disposed at the bottom, or front, or rear of the vehicle 1. The battery 10 may be configured to supply power to the vehicle 1. For example, the battery 10 may serve as an operating power supply of the vehicle 1.

The vehicle 1 may further include a controller 1*b* and a motor 1*a*. The controller 1*b* is configured to control the battery 10 to supply power to the motor 1*a*, for example, to start or navigate the vehicle 1, or meet the operating power requirements of the vehicle in operation.

In some embodiments, the battery 10 serves not only as an operating power supply of the vehicle 1, but may also serve as a drive power supply of the vehicle 1 to provide driving power for the vehicle 1 in place of or partially in place of oil or natural gas.

Figure 2:
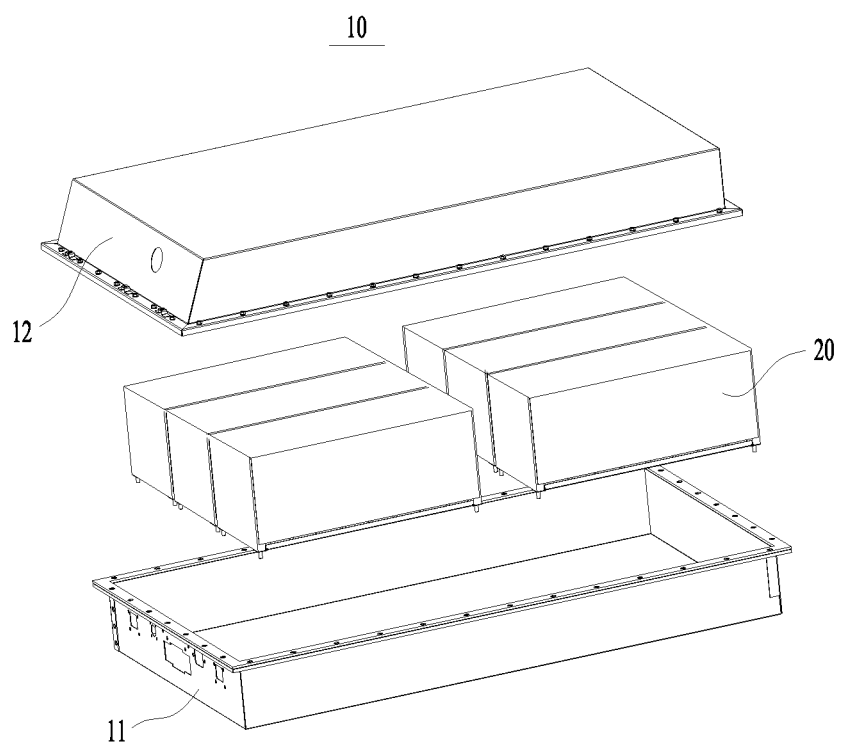
FIG. 2 is a schematic structural exploded view of a battery pack according to one embodiment.

Referring to FIG. 2, the battery 10 includes a battery cell 30 (not shown in FIG. 2). The battery 10 may further include a box configured to accommodate the battery cell 30.

The box is configured to accommodate the battery cell 30. The box may be in various structural forms.

In some embodiments, the box may include a bottom shell 11 and a top shell 12. The bottom shell 11 and the top shell 12 fit each other. The bottom shell 11 and the top shell 12 together define an accommodation space configured to accommodate the battery cell 30. Both the bottom shell 11 and the top shell 12 may hollow structures opened on one side. The opening side of the bottom shell 11 fits the opening side of the top shell 12 to form a box that provides the accommodating space. A sealing element may be disposed between the bottom shell 11 and the top shell 12 to implement a hermetic connection between the bottom shell 11 and the top shell 12.

In practice, the bottom shell 11 may fit on top of the top shell 12. The bottom shell 11 is also referred to as an upper box, and the top shell 12 is also referred to as a lower box.

The bottom shell 11 and the top shell 12 may be in various shapes such as a cylinder or a cuboid. In FIG. 2, as an example, both the bottom shell 11 and the top shell 12 are a cuboidal structure.

There may be one or more battery cells 30 in the battery 10. If there are a plurality of battery cells 30, the plurality of battery cells 30 are connected in series, parallel, or series-and-parallel pattern. The series-and-parallel pattern means a combination of series connection and parallel connection of the plurality of battery cells 30. The plurality of battery cells 30 may be directly connected in series, parallel, or series-and-parallel pattern, and then the whole of the plurality of battery cells 30 may be accommodated in the box. Alternatively, the plurality of battery cells 30 may be connected in series, parallel, or series-and-parallel pattern to form a battery module 20 first. A plurality of battery modules 20 are then connected in series, parallel, or series-and-parallel pattern to form a whole for being accommodated in the box.

Figure 3:
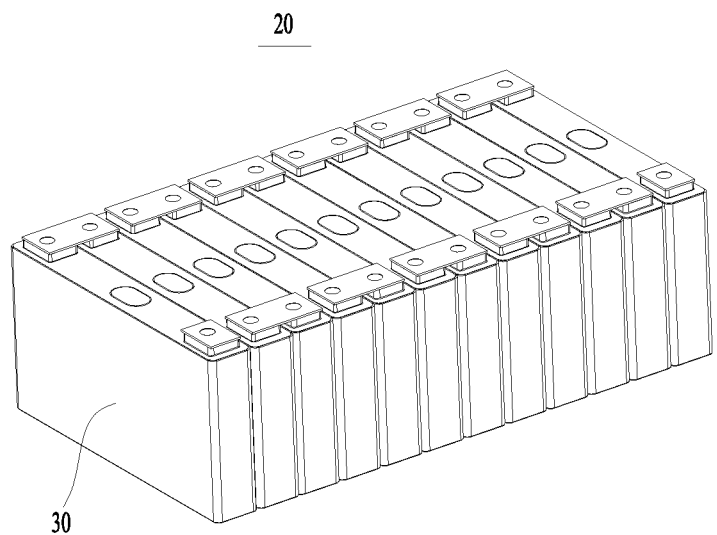
FIG. 3 is a partial schematic structural diagram of a battery module according to one embodiment.

In some embodiments, as shown in FIG. 3, there are a plurality battery cells 30 in the battery 10. The plurality of battery cells 30 are connected in series, parallel, or series-and-parallel pattern to form a battery module 20 first. A plurality of battery modules 20 are then connected in series, parallel, or series-and-parallel pattern to form a whole for being accommodated in the box.

In some embodiments, the plurality of battery cells 30 in the battery module 20 may be electrically connected by a busbar component, so as to implement parallel connection, series connection, or series-parallel connection between the plurality of battery cells 30 in the battery module 20.

Figure 4:
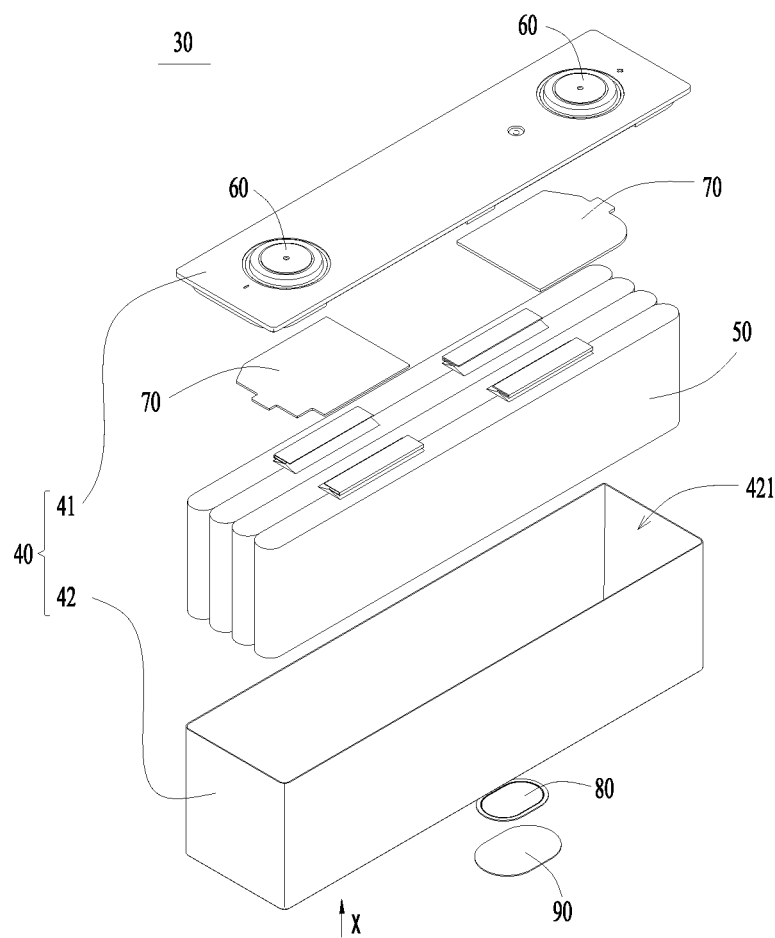
FIG. 4 is a schematic structural exploded view of a battery cell according to one embodiment.

As shown in FIG. 4, the battery cell 30 includes a housing 42, an electrode assembly 50, an end cap assembly, and a connector adapter 70. The housing 42 is provided with an opening 421. The electrode assembly 50 is accommodated in the housing 42. The electrode assembly 50 includes a tab. The end cap assembly includes an end cap 41, an electrode terminal 60, and an insulation piece. The end cap 41 is configured to fit and cover the opening 421. The electrode terminal 60 is mounted on the end cap 41. The insulation piece is located on a side that is of the end cap 41 and that faces the electrode assembly 50. The connector adapter 70 is configured to connect the electrode terminal 60 and the tab, so that the tab is electrically connected to the electrode terminal 60. The shell 40 includes the end cap 41 and the housing 42.

The housing 42 may be in various shapes such as a cylinder or a cuboid. The shape of the housing 42 may be determined depending on the specific shape of the electrode assembly 50. For example, if the electrode assembly 50 is a cylindrical structure, the housing 42 may be a cylindrical structure. If the electrode assembly 50 is a cuboidal structure, the housing 42 may be a cuboidal structure. In FIG. 4, as an example, both the housing 42 and the electrode assembly 50 are a cuboidal structure.

The housing 42 may be made of a variety of materials such as copper, iron, aluminum, stainless steel, or aluminum alloy, without being particularly limited in embodiments of this application.

One or more electrode assemblies 50 may be accommodated in the housing 42. In FIG. 4, two electrode assemblies 50 are accommodated in the housing 42.

In some embodiments, the electrode assembly 50 further includes a positive electrode plate, a negative electrode plate, and a separator. The electrode assembly 50 may be a jelly-roll structure formed by winding the positive electrode plate, the separator, and the negative electrode plate. The electrode assembly 50 may be a stacked structure formed by stacking the positive electrode plate, the separator, and the negative electrode plate.

The positive electrode plate may include a positive current collector and a positive active material layer. The positive active material layer is coated on a surface of the positive current collector. The negative electrode plate may include a negative current collector and a negative active material layer. The negative active material layer is coated on a surface of the negative current collector. The separator is disposed between the positive electrode plate and the negative electrode plate, and is configured to separate the positive electrode plate from the negative electrode plate, so as to reduce risks of short circuits between the positive electrode plate and the negative electrode plate.

The separator may be made of a material such as polypropylene (PP) or polyethylene (PE).

The tab in the electrode assembly 50 is classed into a positive tab and a negative tab. The positive tab may be a part of the positive current collector, the part being not coated with a positive active material layer. The negative tab may be a part of the negative current collector, the part being not coated with a negative active material layer.

Figure 5:
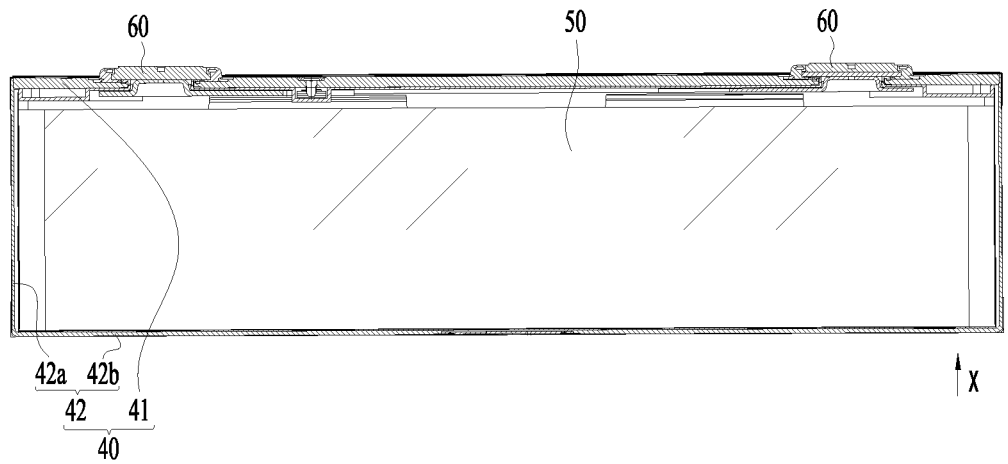
FIG. 5 is a partial schematic structural sectional view of a battery cell according to the embodiment shown in FIG. 4.

In embodiments, referring to FIG. 4 and FIG. 5, the end cap 41 in the end cap assembly is configured to fit and cover the opening 421 of the housing 42 to form a closed space for accommodating the battery cell 30. The closed space may be further configured to accommodate an electrolyte such as an electrolytic solution. The electrode terminal 60 in the end cap assembly may be an output component configured to output electrical energy of the battery cell 30. The number of electrode terminals 60 in the end cap assembly may be one or two.

The number of openings 421 of the housing 42 may be one or two. If the number of openings 421 of the housing 42 is one, the end cap assembly may be one in number. If the number of openings 421 of the housing 42 is two, the end cap assembly may be two in number. The end caps 41 in the two end cap assemblies fit and cover the two openings 421 respectively.

In some embodiments, as shown in FIG. 4, the number of openings 421 of the housing 42 is one, and the end cap assembly is one in number. Two electrode terminals 60 may be disposed in the end cap assembly. One electrode terminal 60 in the end cap assembly is electrically connected to one tab (positive tab) of the electrode assembly 50 by one connector adapter 70. The other electrode terminal 60 in the end cap assembly is electrically connected to the other tab (negative tab) of the electrode assembly 50 by another connector adapter 70.

In other embodiments, the number of openings 421 of the housing 42 is two. The two openings 421 are disposed on two opposite sides of the housing 42 respectively. There are two end cap assemblies. The two end cap assemblies fit on the two openings 421 of the housing 42 respectively. In this case, the number of electrode terminals 60 in the end cap assembly may be one. The electrode terminal 60 in one end cap assembly is electrically connected to one tab (positive tab) of the electrode assembly 50 by one connector adapter 70. The electrode terminal 60 in the other end cap assembly is electrically connected to the other tab (negative tab) of the electrode assembly 50 by another connector adapter 70.

In some embodiments, the battery cell 30 may further include a pressure relief mechanism 80. The pressure relief mechanism 80 is mounted on the shell 40. The pressure relief mechanism 80 is configured to release pressure inside the battery cell 30 when an internal pressure or temperature of the battery cell 30 reaches a threshold.

For example, the pressure relief mechanism 80 may be an explosion-proof valve, a rupture disk, a gas valve, a pressure relief valve, or a safety valve.

Figure 6:
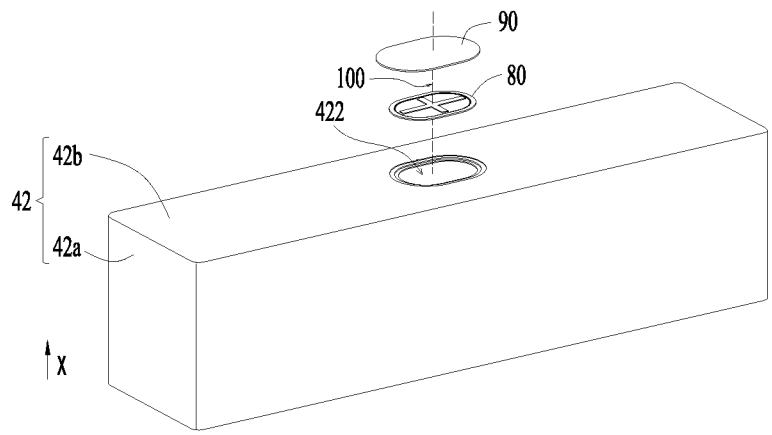
FIG. 6 is a partial schematic structural exploded view of a battery cell according to one embodiment.
Figure 7:
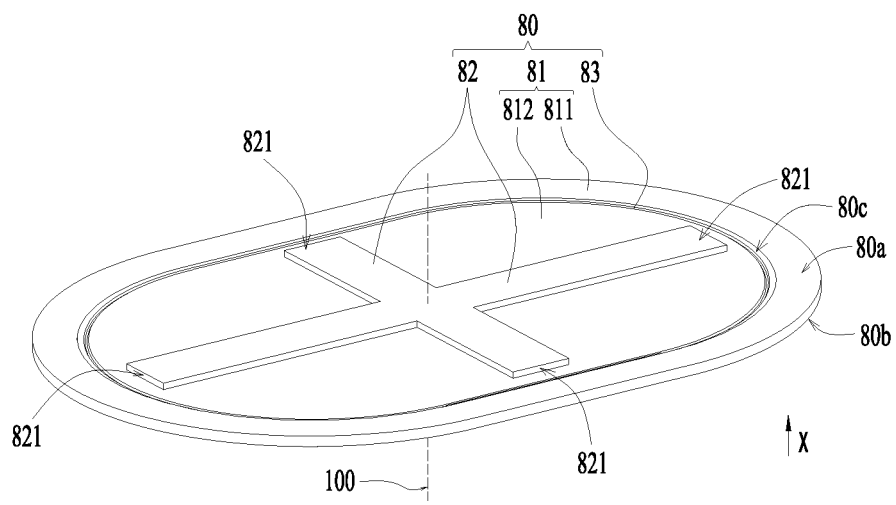
FIG. 7 is a schematic structural diagram of a pressure relief mechanism according to one embodiment.
Figure 8:
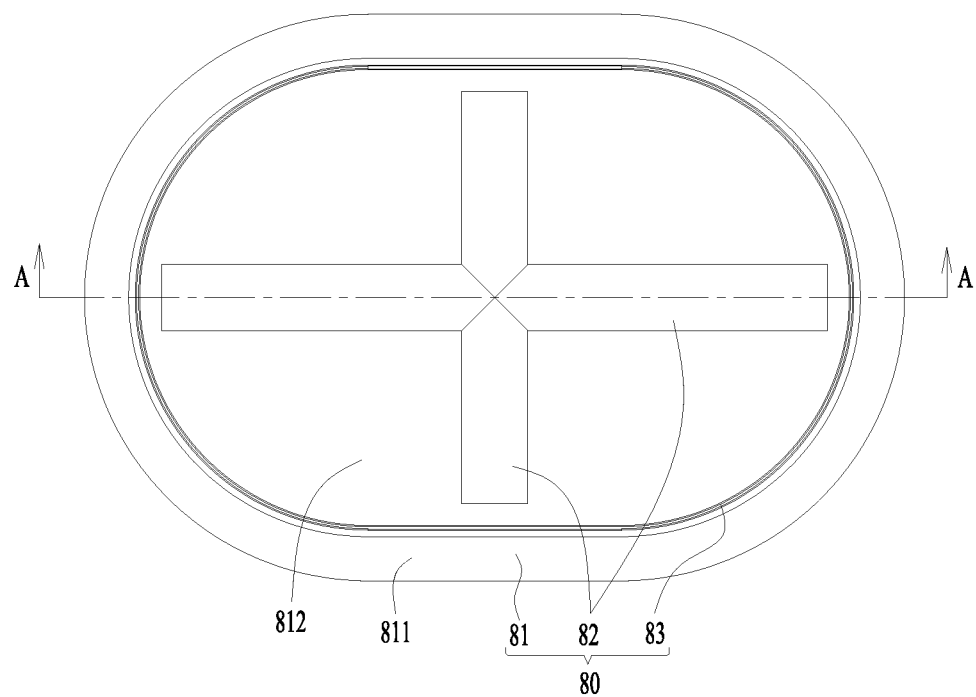
FIG. 8 is a schematic structural top view of a pressure relief mechanism according to another embodiment of this application.
Figure 9:
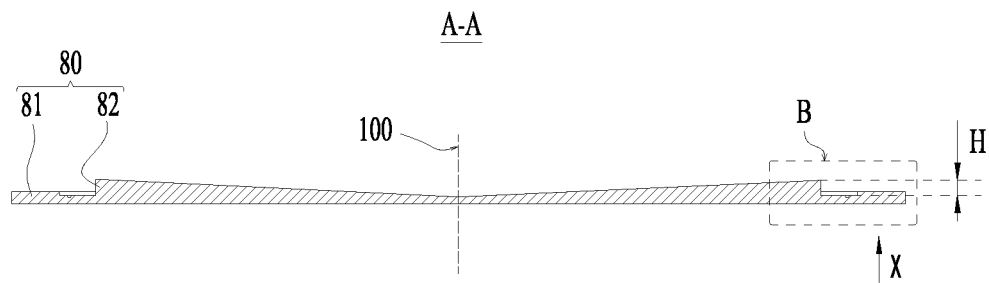
FIG. 9 is a schematic structural sectional view along an A-A section line shown in FIG. 8.
Figure 10:
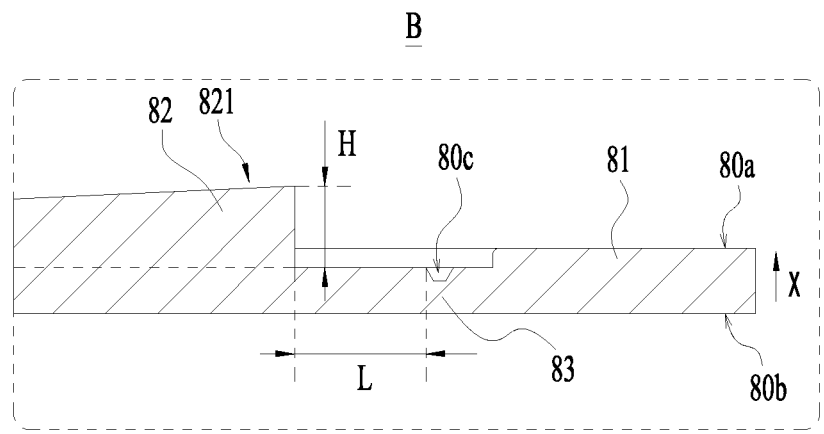
FIG. 10 is an enlarged schematic view of a position B shown in FIG. 9.

In this embodiment, in order to prevent the pressure relief mechanism 80 from bursting prematurely to relieve pressure, as shown in FIG. 6 to FIG. 8, the shell 40 according to this embodiment of this application includes a wall. The battery cell 30 according to this embodiment of this application further includes a pressure relief mechanism 80. The pressure relief mechanism 80 is disposed on the wall. The pressure relief mechanism 80 includes a body portion 81 and a fragile portion 83 connected to the body portion 81. The body portion 81 is configured to connect to the wall. The pressure relief mechanism 80 is configured to break the fragile portion 83 to release pressure when an internal pressure or temperature of the battery cell 30 reaches a threshold. The pressure relief mechanism 80 further includes a reinforcement portion 82 disposed in the body portion 81 in a thickness direction X of the body portion. The reinforcement portion 82 is configured to reduce deformation of the body portion 81.

The internal pressure of the battery cell 30 changes between high and low alternately during transportation, temperature changes, or charging or discharging of the battery cell 30. Consequently, the body portion 81 of the pressure relief mechanism 80 is prone to deform by bulging away from the electrode assembly 50 or by denting toward the electrode assembly 50. At a section closer to the center of the body portion 81, the section of the body portion deforms more significantly by bulging or denting. When the body portion 81 of the pressure relief mechanism 80 is deformed by alternating bulges and dents, the fragile portion 83 connected to the body portion 81 incurs alternating fatigue and aging or breakage under an alternating stress, resulting in decrease of strength of the fragile portion 83 connected to the body portion 81. Consequently, before the internal pressure of the battery cell 30 reaches the preset pressure value, the fragile portion 83 is prone to break to release the internal pressure of the battery cell 30, making the pressure relief mechanism 80 burst prematurely to relieve pressure.

The reinforcement portion 82 of the pressure relief mechanism 80 according to this embodiment can reduce deformation of the body portion 81. Therefore, with the pressure relief mechanism 80 that includes the reinforcement portion 82, the extent of bulge or dent deformation in a corresponding region on the body portion 81 decreases. This helps to decrease an alternating stress borne by the fragile portion 83 connected to the body portion 81, and reduce the probability that the pressure relief mechanism 80 bursts prematurely to relieve pressure when the battery cell 30 is in normal use, where the premature burst is caused by alternating fatigue and aging or breakage of the fragile portion 83 connected to the body portion 81. This also helps to improve the safety and stability of the battery in use.

It needs to be noted that the pressure relief mechanism 80 according to this embodiment is disposed on the wall. Understandably, the shell 40 and the pressure relief mechanism 80 may be discrete structures, that is, may be independently manufactured and then assembled by being connected mechanically. The shell 40 and the pressure relief mechanism 80 may be an integrally formed structure. A preset region of the wall of the shell 40 is thinned to form the pressure relief mechanism 80.

The fragile portion 83 according to this embodiment means a part that is less strong than the body portion 81 and that is prone to be ruptured, broken, torn, or opened on the pressure relief mechanism 80. The fragile portion 83 is disposed on the body portion 81. Understandably, a preset region of the pressure relief mechanism 80 is thinned to form the fragile portion 83, or a preset region of the pressure relief mechanism 80 is subjected to material processing or heat treatment to form the fragile portion 83.

The fragile portion 83 according to this embodiment may be linear, curved, or annular.

The pressure relief mechanism 80 according to this embodiment further includes a reinforcement portion 82 disposed in the body portion 81 in a thickness direction X of the body portion. Understandably, the reinforcement portion 82 may be disposed on at least one of two opposite sides of the body portion 81 along the thickness direction X of the body portion.

In this embodiment, the reinforcement portion 82 and the body portion 81 may be an integrally formed structure, for example, manufactured by casting or forging. Alternatively, the reinforcement portion 82 and the body portion 81 may be mutually independent structural parts. The two portions are manufactured independently first, and then may be assembled by welding connection or fastener connection.

The pressure relief mechanism 80 according to one embodiment includes an outer surface 80a and an inner surface 80b that opposite to each other along the thickness direction X of the pressure relief mechanism. The outer surface 80a of the pressure relief mechanism 80 faces the external environment, and the inner surface 80b faces the inner space of the shell 40. The reinforcement portion 82 may be disposed on at least one of the outer surface 80a or the inner surface 80b.

In this embodiment, the reinforcement portion 82 may be a solid structure or a hollow structure. The reinforcement portion 82 being a solid structure means that a part that is of the reinforcement portion 82 and that protrudes from the body portion 81 is a whole block structure. The reinforcement portion 82 being a hollow structure means that a part that is of the reinforcement portion 82 and that protrudes from the body portion 81 includes a hollow and is a raised arch structure.

The reinforcement portion 82 according to this embodiment may be strip-shaped, curved, or annular. Protrusion thicknesses may be equal or unequal between different parts of the reinforcement portion 82.

The number of reinforcement portions 82 according to this embodiment may be two or more. The two or more reinforcement portions 82 may be spaced apart from each other along one direction, or may intersect.

The reinforcement portion 82 is configured to reduce deformation of the body portion 81. Understandably, compared to the body portion 81 without a reinforcement portion 82, the body portion 81 with a reinforcement portion incurs bulge or dent deformation to a significantly smaller extent because the reinforcement portion 82 can effectively suppress the bulge or dent deformation of the body portion 81 when the body portion 81 bears the same amount of acting force along the thickness direction X.

In some embodiments, as shown in FIG. 6 and FIG. 7, the reinforcement portion 82 protrudes outward from the surface of the body portion 81 along the thickness direction X.

The reinforcement portion 82 is disposed on the outer surface 80a. Without occupying the space inside the battery cell 30, the reinforcement portion 82 can still reduce the possibility that the reinforcement portion 82 is corroded and damaged by an electrolytic solution, where the corrosion and damage impair the strength of the reinforcement portion 82.

According to some embodiments, the reinforcement portion 82 is a solid bulge disposed on the body portion 81. The reinforcement portion 82 protrudes from the surface of the body portion 81, so as to serve a purpose of reinforcing corresponding regions of the body portion 81.

When the reinforcement portion 82 is a solid bulge, the reinforcement portion 82 is relatively strong and highly resistant to impact deformation. Therefore, when an external force is exerted on the reinforcement portion 82, the reinforcement portion 82 is not prone to being dented, collapsed, or deformed.

In some embodiments, the reinforcement portion 82 and the body portion 81 are an integrally formed structure, helping to increase the strength of connection between the reinforcement portion 82 and the body portion 81.

In some embodiments, the fragile portion 83 is formed by making a groove 80c on the pressure relief mechanism 80. The thickness of the fragile portion 83 is less than the thickness of the body portion 81, so that the strength of the fragile portion 83 is less than the strength of the body portion 81.

For example, the groove 80*c* may be formed mechanically by removing a part of material from the pressure relief mechanism 80, thereby helping to reduce cost and difficulty of processing. Along the thickness direction X, the fragile portion 83 is disposed corresponding to the groove 80*c*.

In some examples, referring to FIG. 7, the groove 80*c* is disposed on an outer surface 80*a* of the pressure relief mechanism 80.

In some embodiments, referring to FIG. 7, the groove 80*c* on the pressure relief mechanism 80 is annular. The fragile portion 83 corresponding to the groove 80*c* is also annular. The body portion 81 includes a first connecting portion 811 and a second connecting portion 812. The first connecting portion 811 and the second connecting portion 812 are located on two sides of the groove 80*c* along a width direction of the groove respectively. The first connecting portion 811 is configured to connect the wall of the shell 40. The second connecting portion 812 is located in a region enclosed by the groove 80*c*. The reinforcement portion 82 is disposed on the second connecting portion 812.

When the internal pressure of the battery cell 30 changes between high and low alternately, the bulge or dent deformation in the region enclosed by the groove 80*c* is severer than in a peripheral region of the groove 80*c*. Therefore, the extent of deformation of the region enclosed by the groove 80*c* is greater.

In some examples, the region enclosed by groove 80*c* may be racetrack-shaped. Alternatively, the region enclosed by the groove 80*c* may be circular, rectangular, or oval in shape.

The reinforcement portion 82 is located in a region enclosed by the groove 80*c*. Therefore, the reinforcement portion 82 increases the strength of the region enclosed by the groove 80*c*, helps to reduce the extent of deformation of the region enclosed by the groove 80*c*, and in turn, reduces the alternating stress borne by the fragile portion 83 connected to the body portion 81.

In some embodiments, referring to FIG. 7 to FIG. 10, the reinforcement portion 82 includes two end regions 821. A minimum thickness of each end region 821 of the reinforcement portion 82 is H. A minimum spacing between the end region 821 and the groove 80*c* is L, where $0.1 < H/L < 0.45$.

When the ratio of H to L is less than or equal to 0.1, the minimum thickness of the end region 821 of the reinforcement portion 82 is deficient, or the minimum spacing between the end region 821 and the groove 80*c* is excessive. In this case, the reinforcement effect exerted by the reinforcement portion 82 on the region close to the groove 80*c* on the body portion 81 is insignificant or absent. Consequently, the amount of deformation of the region close to the groove 80*c* on the body portion 81 is still excessive when the same pressure is borne, and therefore, the alternating stress borne by the fragile portion 83 connected to the body portion 81 is still relatively large.

When the ratio of H to L is greater than or equal to 0.45, the minimum thickness of the end region 821 of the reinforcement portion 82 is excessive, or the minimum spacing between the end region 821 and the groove 80*c* is deficient. In this case, the reinforcement strength exerted by the reinforcement portion 82 on the region close to the groove 80*c* on the body portion 81 is excessive. Consequently, the amount of deformation of the region close to the groove 80*c* on the body portion 81 is deficient when the same pressure is borne. This makes it possible that the fragile portion 83 connected to the body portion 81 is still not broken when the internal pressure of the battery cell 30 reaches a preset value, and affects the normal burst and pressure relieving action of the pressure relief mechanism 80.

It should be noted that the minimum spacing between the end region 821 and the groove 80*c* is measured along a direction perpendicular to an axis 100, and measured from a root region of the end region 821 of the reinforcement portion 82 to an edge that is of the groove 80*c* and that is close to the reinforcement portion 82.

In some examples, the thickness of the end region 821 of the reinforcement portion 82 may range from 0.2 millimeters (mm) to 0.45 millimeters.

In some examples, the minimum spacing between the end region 821 and the groove 80*c* ranges from 1 millimeter to 2 millimeters.

In some embodiments, the minimum spacing between one end region 821 of the reinforcement portion 82 and the groove 80*c* is equal to the minimum spacing between the other end region of the reinforcement portion and the groove. The two end regions 821 of the reinforcement portion 82 exert the same reinforcement strength on the region close to the groove 80*c* on the body portion 81, thereby reducing the probability that the extent of deformation varies between the regions corresponding to the two end regions 821 on the body portion 81. This helps to ensure consistency of the pressure values that can be endured when the fragile portion 83 connected to the body portion 81 is broken.

In some embodiments, referring to FIG. 7 to FIG. 10, the region enclosed by groove 80*c* possesses an axis 100. The reinforcement portion 82 includes two end regions 821. The thickness of the end regions 821 of the reinforcement portion 82 gradually decreases along a direction from the end regions 821 of the reinforcement portion 82 to the axis 100 of the region enclosed by the groove 80*c*.

The thicker the reinforcement portion 82, the more significant the reinforcement effect on the body portion 81, and the smaller the amount of deformation of the body portion 81 under the same pressure. Because the thickness of the end regions 821 of the reinforcement portion 82 gradually decreases, at a region closer to the groove 80*c*, the region of the reinforcement portion 82 exerts a more significant reinforcement effect on the body portion 81. Therefore, at a region closer to the groove 80*c*, the region of the body portion 81 is deformed to a smaller extent. A region farther away from the groove 80*c* is deformed to a greater extent. Because the region farther away from the groove 80*c* on the body portion 81 is deformed to a greater extent by bulging, the shearing force along the thickness direction X borne by the fragile portion 83 connected to the body portion 81 is greater. Therefore, it is ensured that the fragile portion 83 connected to the body portion 81 can break and burst in time to relieve pressure when the internal pressure of the battery cell 30 reaches a preset pressure value.

The reinforcement portion 82 with gradually changing thicknesses reduces the probability that the fragile portion 83 connected to the body portion 81 is prematurely broken, and also reduces the probability that, due to the reinforcement portion 82 disposed, the fragile portion 83 connected to the body portion 81 is not easily broken accurately in time because of a deficient shearing force borne along the thickness direction X by the fragile portion 83 connected to the body portion 81.

It should be noted that the direction from the end regions 821 to the axis 100 of the region enclosed by the groove 80*c* is a direction perpendicular to the axis 100. The thickness of the end regions 821 of the reinforcement portion 82 is measured from the surface of the body portion 81 to a highest point away from the surface of the body portion 81 on the end regions 821 along an extension direction of the axis 100.

In some examples, the overall thickness of the reinforcement portion 82 gradually decreases from the end regions 821 to a central region of the reinforcement portion 82 on the reinforcement portion 82, so that a surface that is of the reinforcement portion 82 and that faces back from the body portion 81 is V-shaped.

In some embodiments, the reinforcement portion 82 is two in number. The two reinforcement portions 82 intersect. The two reinforcement portions 82 may extend in different directions. Each reinforcement portion 82 exerts a reinforcing force on the body portion 81 from a different direction, thereby helping to improve consistency of overall reinforcement effects exerted by the reinforcement portion 82 on the body portion 81, and in turn, helping to improve consistency of the pressure values that can be endured when the fragile portion 83 connected to the body portion 81 is broken at different positions.

In some embodiments, the reinforcement portions 82 are strip-shaped structures. The two reinforcement portions 82 are perpendicular to each other, thereby reinforcing different regions of the body portion 81 in two mutually perpendicular directions, and helping to further increase the overall strength of the body portion 81.

In some embodiments, the groove 80c is annular. Along the thickness direction X, an orthographic projection area of the two reinforcement portions 82 is S1, and an orthographic projection area of a region enclosed by the groove 80c is S2, where 0.2<S1/S2<0.3. In this way, the coverage area of the reinforcement portion 82 is large enough to ensure that the reinforcement portion 82 exerts a reinforcement effect on the body portion 81. When a ratio of S1 to S2 is less than or equal to 0.2, the orthographic projection area of the two reinforcement portions 82 is deficient. That is, the coverage area of the two reinforcement portions 82 is deficient. Consequently, it is possible that some regions on the body portion 81 fail to be reinforced by the reinforcement portion 82. Consequently, some regions corresponding to the groove 80c on the body portion 81 still bear the alternating stress, and the pressure relief mechanism 80 may burst prematurely to relieve pressure due to alternating fatigue and aging or breakage in such regions. When the ratio of S1 to S2 is greater than or equal to 0.3, the orthographic projection area of the two reinforcement portions 82 is excessive. That is, the coverage area of the two reinforcement portions 82 is excessive. Consequently, the overall reinforcement strength exerted by the reinforcement portions 82 on the body portion 81 is excessive, and the body portion 81 is hardly deformable as a whole. Therefore, it is possible that the fragile portion 83 connected to the body portion 81 is not broken in time under a preset pressure value.

Figure 11:
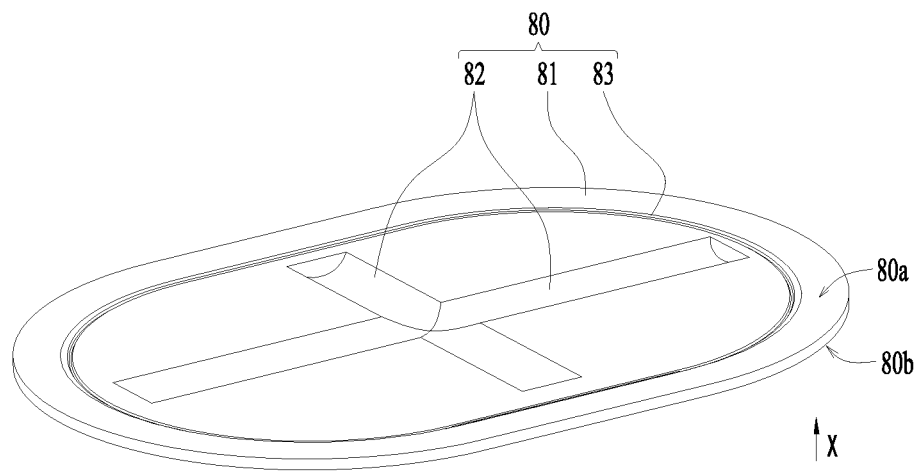
FIG. 11 is a schematic structural diagram of a pressure relief mechanism according to a still another embodiment of this application.

In some embodiments, referring to FIG. 11, the reinforcement portions 82 are hollow structures. Each reinforcement portion 82 is a rib (not shown in the drawing) raised against an inner surface 80b of the body portion 81. A dented region corresponding to the position of the rib is formed on the body portion 81. The dented region is a region dented from an outer surface 80a of the body portion 81 toward the inner surface 80b of the body portion 81. In other embodiments, each reinforcement portion 82 is a rib raised against the outer surface 80b of the body portion 81. A dented region corresponding to the position of the rib is formed on the body portion 81. The dented region is a region dented from the inner surface 80b of the body portion 81 toward the outer surface 80a of the body portion 81. For example, the body portion 81 and the reinforcement portion 82 may be integrally formed by stamping or calendering.

Figure 12:
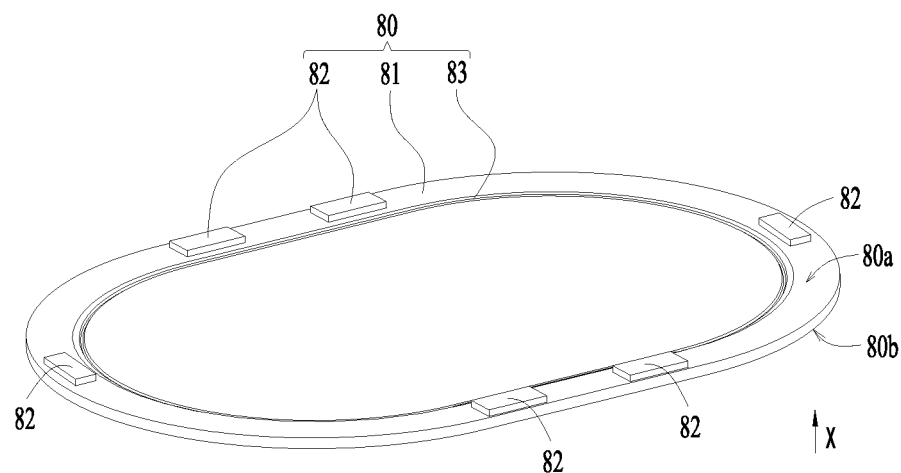
FIG. 12 is a schematic structural diagram of a pressure relief mechanism according to a yet another embodiment of this application.

In some embodiments, referring to FIG. 12, the groove 80c is annular. The reinforcement portions 82 are located on a peripheral region of the groove 80c. The peripheral region of the groove 80c is configured to connect to the wall of the shell 40. A plurality of reinforcement portions 82 are spaced out around the groove 80c. For example, the plurality of reinforcement portions 82 are evenly distributed around the groove 80c.

Figure 13:
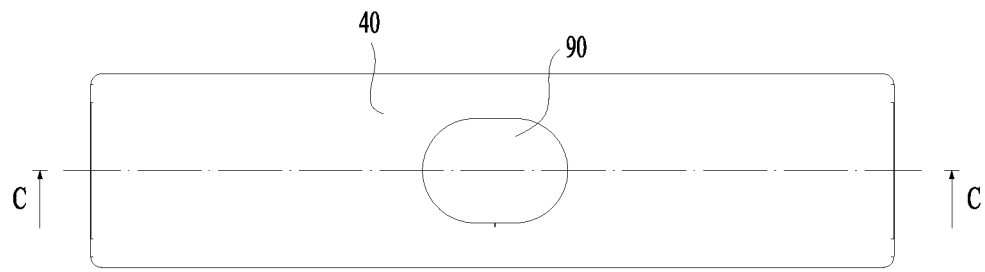
FIG. 13 is a schematic structural top view of a battery cell according to one embodiment.
Figure 14:
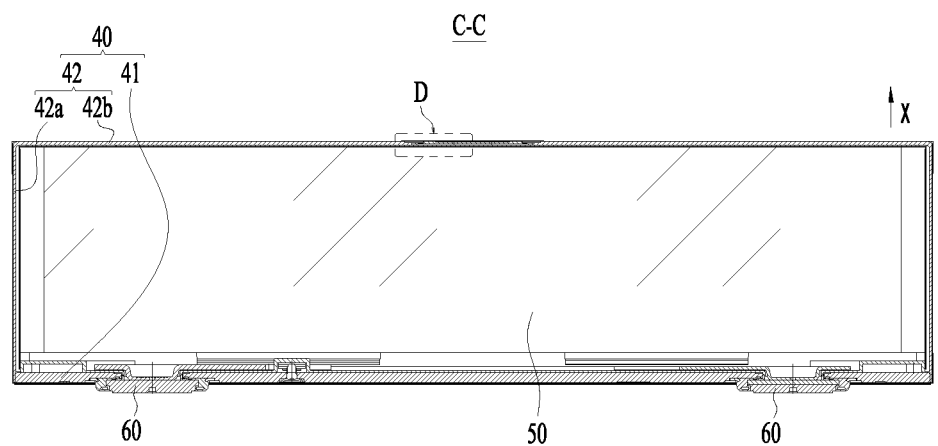
FIG. 14 is a schematic structural sectional view along a C-C section line shown in FIG. 13.
Figure 15:
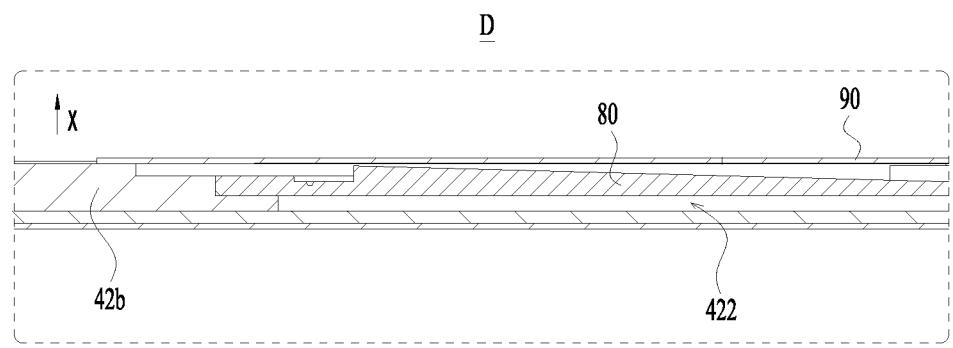
FIG. 15 is an enlarged schematic view of a position D shown in FIG. 14.

In some embodiments, referring to FIG. 13 to FIG. 15, a through-hole 422 is made on the wall of the shell 40. The body portion 81 covers the through-hole 422. The reinforcement portion 82 is located in the through-hole 422. The reinforcement portion 82 does not exceed an outer surface of the wall along a direction from inside the shell 40 outward. The direction from inside the shell 40 outward may be the same as an axial direction of the through-hole 422.

When another structural part is disposed at a position corresponding to the through-hole 422 on the outer side of the battery cell 30, an active space is reserved between the reinforcement portion 82 and the structural part. In this way, the body portion 81 can bulge and deform normally to ensure that the fragile portion 83 connected to the body portion 81 is broken in time under a preset pressure value. This reduces the probability that the fragile portion 83 connected to the body portion 81 is hardly breakable in time under a preset pressure value because the body portion 81 can hardly bulge and deform due to contact between the reinforcement portion 82 and the structural part.

In some embodiments, referring to FIG. 15, the battery cell 30 further includes a protection sheet 90. The protection sheet 90 is attached to the outer surface of the wall of the shell 40 and covers the pressure relief mechanism 80.

The protection sheet 90 can protect the pressure relief mechanism 80, and reduce the probability that an external object accidentally impacts or scratches the body portion 81 so that the body portion 81 is distorted or deformed or dented to affect normal breakage and burst of the fragile portion 83 connected to the body portion 81.

In some examples, the protection sheet 90 is located in the through-hole 422, and a surface that is of the protection sheet 90 and that faces back from the pressure relief mechanism 80 is flush with the outer surface of the shell 40. The protection sheet 90 may be made of a material such as polyethylene, polypropylene, or other plastic.

In some embodiments, referring to FIG. 13 to FIG. 15, the shell 40 includes an end cap 41 and a housing 42. The housing 42 is provided with an opening 421. The end cap 41 is configured to cover the opening 421. The housing 42 includes a sidewall 42a and a bottom wall 42b. The sidewall 42a is configured to connect to the end cap 41. The bottom wall 42b is disposed opposite to the opening 421 of the housing 42 along the thickness direction X. Both the thickness of the sidewall 42a and the thickness of the bottom wall 42b are less than the thickness of the end cap 41. The wall is the sidewall 42a or the bottom wall 42b.

The end cap 41 and the housing 42 are discrete structures. The end cap and the housing are hermetically connected to form the shell 40. The pressure relief mechanism 80 may be disposed on the sidewall 42a and/or the bottom wall 42b.

The thickness of the housing 42 is less than the thickness of the end cap 41, so that the end cap 41 is more rigid than the housing 42. Under the same pressure, the extent of deformation of the end cap 41 is smaller than that of the housing 42. In a process of transportation, temperature change, or charging or discharging of the battery cell 30, the internal pressure of the battery cell 30 changes between high and low alternately. Therefore, the pressure relief mechanism 80 is disposed on the sidewall 42a and/or bottom wall 42b of the housing 42 rather than on the end cap 41. In this way, in a case that the end cap 41 is disposed toward a passenger compartment, high-temperature and high-pressure emissions are not prone to be expelled to the passenger compartment at the time of actuating the pressure relief mechanism 80, thereby avoiding direct threat to personal safety.

Further, the thickness of the sidewall 42a or bottom wall 42b of the housing 42 is less than the thickness of the end cap 41. Therefore, the sidewall 42a or bottom wall 42b of the housing 42 is deformed to a greater extent than the end cap 41 under the internal pressure, and in turn, exerts a greater impact on the pressure relief mechanism 80, resulting in a greater extent of deformation of the body portion 81. In this case, it is more necessary for the reinforcement portion 82 to reinforce the body portion 81 to reduce the deformation of the body portion 81 and thereby reduce the alternating stress borne by the fragile portion 83.

In some examples, referring to FIG. 14 and FIG. 15, a through-hole 422 is made on the bottom wall 42b of the housing 42. The electrode assembly 50 is located between the bottom wall 42b of the housing 42 and the end cap 41. When the battery cell 30 is applied to an electrical device such as a vehicle, a ship, or an aircraft, the end cap 41 of the battery cell 30 is disposed upward in a vertical direction, and the bottom wall 42b of the housing 42 is disposed downward, so that the end cap 41 of the battery cell 30 is closer to occupants than the bottom wall 42b of the housing 42. Therefore, when the pressure relief mechanism 80 is disposed on the bottom wall 42b of the housing 42, in a case that the pressure relief mechanism 80 bursts to relieve pressure, the high-temperature and high-pressure emissions from the battery cell 30 are not prone to directly threaten personal safety, thereby improving the safety of the battery cell 30 in use.

Figure 16:
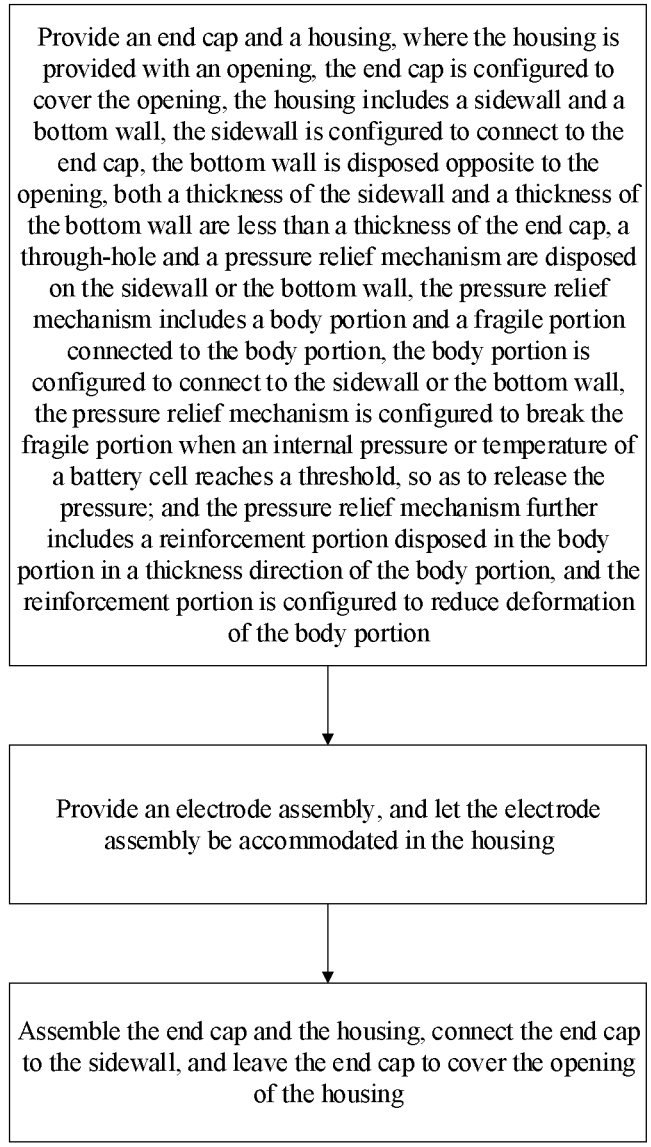
FIG. 16 is a schematic flowchart of a method for manufacturing a battery cell according to one embodiment.

Referring to FIG. 16, one embodiment further provides a method for manufacturing a battery cell 30. The method includes:

providing an end cap 41 and a housing 42, where the housing 42 is provided with an opening 421, the end cap 41 is configured to cover the opening 421, the housing 42 includes a sidewall 42a and a bottom wall 42b, the sidewall 42a is configured to connect to the end cap 41, the bottom wall 42b is disposed opposite to the opening 421, both a thickness of the sidewall 42a and a thickness of the bottom wall 42b are less than a thickness of the end cap 41, a through-hole 422 and a pressure relief mechanism 80 are disposed on the sidewall 42a or the bottom wall 42b, the pressure relief mechanism 80 includes a body portion 81 and a fragile portion 83 connected to the body portion 81, the body portion 81 is configured to connect to the sidewall 42a or the bottom wall 42b, the pressure relief mechanism 80 is configured to break the fragile portion 83 when an internal pressure or temperature of the battery cell 30 reaches a threshold, so as to release the pressure; and the pressure relief mechanism 80 further includes a reinforcement portion 82 disposed in the body portion 81 in a thickness direction of the body portion, and the reinforcement portion 82 is configured to reduce deformation of the body portion 81;

providing an electrode assembly 50, and letting the electrode assembly 50 be accommodated in the housing 42; and assembling the end cap 41 and the housing 42, connecting the end cap 41 to the sidewall 42a, and leaving the end cap to cover the opening 421 of the housing 42.

In the battery cell 30 manufactured by the method for manufacturing a battery cell 30 according to this embodiment of this application, the reinforcement portion 82 of the pressure relief mechanism 80 can reinforce the body portion 81, and reduce deformation of the body portion 81. Therefore, with the pressure relief mechanism 80 that includes the reinforcement portion 82, the extent of bulge or dent deformation of the body portion 81 of the pressure relief mechanism 80 decreases when the internal pressure of the battery cell 30 changes between high and low alternately. This helps to decrease the alternating stress borne by the fragile portion 83 connected to the body portion 81, and reduce the probability that the pressure relief mechanism 80 bursts prematurely to relieve pressure when the battery cell 30 is in normal use, where the premature burst is caused by alternating fatigue and aging or breakage of the fragile portion 83 connected to the body portion 81. This also helps to improve the safety and stability of the battery in use.

The method for manufacturing a battery cell 30 according to this embodiment of this application can be used to manufacture the battery cell 30 according to the foregoing embodiments.

Figure 17:
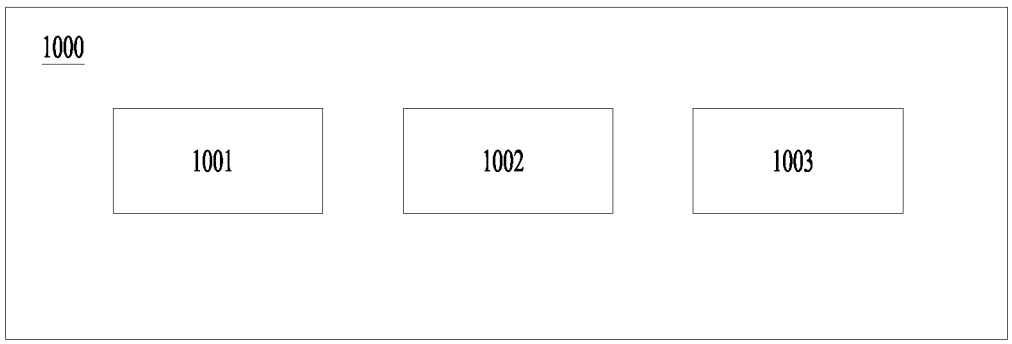
FIG. 17 is a schematic structural diagram of a device for manufacturing a battery cell according to one embodiment.

Referring to FIG. 17, one embodiment further provides a device 1000 for manufacturing a battery cell 30. The device includes:

a first providing module 1001, configured to provide an end cap 41 and a housing 42, where the housing 42 is provided with an opening 421, the end cap 41 is configured to cover the opening 421, the housing 42 includes a sidewall 42a and a bottom wall 42b, the sidewall 42a is configured to connect to the end cap 41, the bottom wall 42b is disposed opposite to the opening 421, both a thickness of the sidewall 42a and a thickness of the bottom wall 42b are less than a thickness of the end cap 41, a through-hole 422 and a pressure relief mechanism 80 are disposed on the sidewall 42a or the bottom wall 42b, the pressure relief mechanism 80 includes a body portion 81 and a fragile portion 83 connected to the body portion 81, the body portion 81 is configured to connect to the sidewall 42a or the bottom wall 42b, the pressure relief mechanism 80 is configured to break the fragile portion 83 when an internal pressure or temperature of the battery cell 30 reaches a threshold, so as to release the pressure; and the pressure relief mechanism 80 further includes a reinforcement portion 82 disposed in the body portion 81 in a thickness direction of the body portion, and the reinforcement portion 82 is configured to reduce deformation of the body portion 81;

a second providing module 1002, configured to provide an electrode assembly 50, and let the electrode assembly 50 be accommodated in the housing 42; and an assembling module 1003, configured to assemble the end cap 41 and the housing 42, connect the end cap 41 to the sidewall 42a, and leave the end cap to cover the opening 421.

In the battery cell 30 manufactured by the device 1000 for manufacturing a battery cell 30 according to this embodiment of this application, the reinforcement portion 82 of the pressure relief mechanism 80 can reinforce the body portion 81, and reduce deformation of the body portion 81. Therefore, with the pressure relief mechanism 80 that includes the reinforcement portion 82, the extent of bulge or dent deformation of the body portion 81 of the pressure relief mechanism 80 decreases when the internal pressure of the battery cell 30 changes between high and low alternately. This helps to decrease the alternating stress borne by the fragile portion 83 connected to the body portion 81, and reduce the probability that the pressure relief mechanism 80 bursts prematurely to relieve pressure when the battery cell 30 is in normal use, where the premature burst is caused by alternating fatigue and aging or breakage of the fragile portion 83 connected to the body portion 81. This also helps to improve the safety and stability of the battery in use.

The device for manufacturing a battery cell 30 according to this embodiment of this application can implement the method for manufacturing a battery cell 30 according to the foregoing embodiment.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery cell, comprising:
   a shell, wherein the shell comprises a wall; and
   a pressure relief mechanism disposed on the wall, wherein the pressure relief mechanism comprises
   a body portion and a fragile portion connected to the body portion, wherein the body portion is configured to connect to the wall, and the pressure relief mechanism is configured to break the fragile portion when an internal pressure or temperature of the battery cell reaches a threshold, so as to release the pressure; and
   a reinforcement portion disposed in the body portion in a thickness direction of the body portion, wherein the reinforcement portion is configured to reduce deformation of the body portion;
   the fragile portion is formed by making a groove on the pressure relief mechanism, and a thickness of the fragile portion is less than a thickness of the body portion;
   the region enclosed by the groove possesses an axis, the reinforcement portion comprises two end regions, and a thickness of the end regions gradually decreases in a direction from the end regions to the axis.

2. The battery cell according to claim 1, wherein the reinforcement portion protrudes outward from a surface of the body portion along the thickness direction.

3. The battery cell according to claim 2, wherein the reinforcement portion is a solid bulge disposed on the body portion.

4. The battery cell according to claim 1, wherein the groove is annular, the body portion comprises a first connecting portion and a second connecting portion, the first connecting portion and the second connecting portion are located on two sides of the groove along a width direction of the groove respectively, the first connecting portion is configured to connect the wall, the second connecting portion is located in a region enclosed by the groove, and the reinforcement portion is disposed on the second connecting portion.

5. The battery cell according to claim 4, wherein a minimum thickness of the end regions is H, and a minimum spacing between the end regions and the groove is L, wherein $0.1 < H/L < 0.45$.

6. The battery cell according to claim 4, wherein a minimum spacing between one of the end regions and the groove is equal to a minimum spacing between the other end region and the groove.

7. The battery cell according to claim 1, wherein the reinforcement portion comprises two reinforcement portions that intersect.

8. The battery cell according to claim 7, wherein the two reinforcement portions are strip-shaped structures, and the two reinforcement portions are perpendicular to each other.

9. The battery cell according to claim 7, wherein, along the thickness direction, an orthographic projection area of the two reinforcement portions is S1, and an orthographic projection area of a region enclosed by the groove is S2, wherein $0.2 < S1/S2 < 0.3$.

10. The battery cell according to claim 1, wherein a through-hole is made on the wall, the body portion covers the through-hole, the reinforcement portion is located in the through-hole, and the reinforcement portion does not exceed an outer surface of the wall along a direction from inside the shell outward.

11. The battery cell according to claim 10, wherein the battery cell further comprises a protection sheet, and the protection sheet is attached to the outer surface of the wall and covers the pressure relief mechanism.

12. The battery cell according to claim 1, wherein the shell comprises an end cap and a housing, wherein
   the housing is provided with an opening, and the end cap is configured to cover the opening; and
   the housing comprises a sidewall and a bottom wall, the sidewall is configured to connect to the end cap, the bottom wall and the opening are disposed opposite to each other along the thickness direction, both a thickness of the sidewall and a thickness of the bottom wall are less than a thickness of the end cap, and the wall is the sidewall or the bottom wall.

13. A battery, comprising the battery cell according to claim 1.

14. An electrical device, comprising the battery according to claim 13, wherein the battery is configured to provide electrical energy.

15. A method for manufacturing a battery cell, comprising:
   providing an end cap and a housing, wherein the housing is provided with an opening, the end cap is configured to cover the opening, and the housing comprises a sidewall and a bottom wall, wherein
   the sidewall is configured to connect to the end cap,
   the bottom wall is disposed opposite to the opening along a thickness direction, wherein both a thickness of the sidewall and a thickness of the bottom wall are less than a thickness of the end cap,
   a through-hole and a pressure relief mechanism are disposed on the sidewall or the bottom wall, wherein the pressure relief mechanism comprises a body portion and a fragile portion connected to the body portion, wherein
   the body portion is configured to connect to the sidewall or the bottom wall, the pressure relief mechanism is configured to break the fragile portion when an internal pressure or temperature of the battery cell reaches a threshold, so as to release the pressure, and the pressure relief mechanism further comprises a reinforcement portion disposed in the body portion in the thickness direction of the body portion, and the reinforcement portion is configured to reduce deformation of the body portion;

the fragile portion is formed by making a groove on the pressure relief mechanism, and a thickness of the fragile portion is less than a thickness of the body portion;

the region enclosed by the groove possesses an axis, the reinforcement portion comprises two end regions, and a thickness of the end regions gradually decreases in a direction from the end regions to the axis;

providing an electrode assembly, and letting the electrode assembly be accommodated in the housing; and assembling the end cap and the housing, connecting the end cap to the sidewall, and leaving the end cap to cover the opening.

16. A device for manufacturing a battery cell, comprising:

a first providing module, configured to provide an end cap and a housing, wherein the housing is provided with an opening, the end cap is configured to cover the opening, the housing comprises a sidewall and a bottom wall, the sidewall is configured to connect to the end cap, the bottom wall is disposed opposite to the opening along a thickness direction, both a thickness of the sidewall and a thickness of the bottom wall are less than a thickness of the end cap, a through-hole and a pressure relief mechanism are disposed on the sidewall or the bottom wall, the pressure relief mechanism comprises a body portion and a fragile portion connected to the body portion, the body portion is configured to connect to the sidewall or the bottom wall, the pressure relief mechanism is configured to break the fragile portion when an internal pressure or temperature of the battery cell reaches a threshold, so as to release the pressure; and the pressure relief mechanism further comprises a reinforcement portion disposed in the body portion in the thickness direction of the body portion, and the reinforcement portion is configured to reduce deformation of the body portion;

the fragile portion is formed by making a groove on the pressure relief mechanism, and a thickness of the fragile portion is less than a thickness of the body portion;

the region enclosed by the groove possesses an axis, the reinforcement portion comprises two end regions, and a thickness of the end regions gradually decreases in a direction from the end regions to the axis; and a second providing module, configured to provide an electrode assembly, and let the electrode assembly be accommodated in the housing; and an assembling module, configured to assemble the end cap and the housing, connect the end cap to the sidewall, and leave the end cap to cover the opening.

* * * * *